(12) United States Patent
Benavides

(10) Patent No.: US 6,687,931 B1
(45) Date of Patent: Feb. 10, 2004

(54) PET CUSHION COVER

(75) Inventor: Jesus Benavides, Arlington, TX (US)

(73) Assignee: Doskocil Manufacturing Company, Inc., Arlington, TX (US)

( * ) Notice: Subject to any disclaimer, the term of this patent is extended or adjusted under 35 U.S.C. 154(b) by 0 days.

(21) Appl. No.: 10/418,071

(22) Filed: Apr. 18, 2003

(51) Int. Cl.$^7$ ................................................ A47G 9/02
(52) U.S. Cl. ........................ 5/490; 5/485; 5/486; 5/502
(58) Field of Search ........................... 5/485, 490, 501, 5/486, 502

(56) References Cited

U.S. PATENT DOCUMENTS

| | | |
|---|---|---|
| 3,109,474 A | 11/1963 | Levi |
| 4,241,458 A | 12/1980 | Lesesne |
| 4,646,376 A | 3/1987 | Sulley |
| 4,875,245 A | 10/1989 | Isola |
| 5,010,843 A | 4/1991 | Henry |
| 5,047,001 A | 9/1991 | Willis |
| D331,475 S | 12/1992 | Sineath |
| 5,327,851 A | 7/1994 | Pare et al. |
| 5,357,901 A | 10/1994 | Batts |
| D355,077 S | 2/1995 | Tegner |
| 5,455,973 A | 10/1995 | Brumfield et al. |
| D381,234 S | 7/1997 | Lupoff |
| 5,765,502 A | 6/1998 | Haugh |
| 5,940,909 A | 8/1999 | Sapp |
| 6,142,879 A | 11/2000 | Phillips |
| D441,146 S | 4/2001 | Passmore |
| 6,286,162 B1 | 9/2001 | Huart |

FOREIGN PATENT DOCUMENTS

WO    WO 98/01024 A1    1/1998

*Primary Examiner*—Teri Pham Luu
(74) *Attorney, Agent, or Firm*—Locke Liddell & Sapp LLP (57) ABSTRACT

A cushion cover for selectively displaying a first motif and a second motif. The cushion cover contains a first pocket and a second pocket disposed inside the first pocket when the first motif is displayed. In this configuration, the first pocket is adapted to receive and fully enclose the cushion. When it is desired to display the second motif, the second pocket is removed from the first pocket, and the first pocket is disposed inside the second pocket. In this configuration, the second pocket is adapted to receive and fully enclose the cushion.

18 Claims, 8 Drawing Sheets

PET CUSHION COVER

TECHNICAL FIELD OF THE INVENTION

The present invention relates to a cover for a pet cushion. More particularly, the present invention relates to a cover for a pet cushion for selectively displaying differing surface patterns thereon.

BACKGROUND OF THE INVENTION

Pet cushion covers exist that are capable of displaying multiple surface patterns or designs. However, many of these covers are difficult to construct. Oftentimes, in order to construct the cushion covers, intricate stitching methods and equipment are required.

In addition, various reversible pet cushion covers do not completely cover the pet cushion. Because portions of the cushion are exposed and remain unprotected, the life of the cushion can be reduced, especially if the cushion is exposed to the outside environment. In addition, dust, pet fur, dirt and any other unwanted foreign debris may collect inside the cover. Finally, because these covers cannot completely enclose the cushion, pets have easy access to the cushion and can potentially destroy the cushion.

There is a need to provide a cushion cover, to address the above-identified issues.

SUMMARY OF THE INVENTION

The present invention relates to a cushion cover to selectively display differing motifs. The cushion cover contains a first pocket having an opening to selectively receive the cushion. The first pocket is fabricated from a material displaying a first motif.

The cushion cover further contains a second pocket disposed inside the first pocket. The second pocket also has an opening to selectively receive the cushion. The second pocket opening is offset from the first pocket opening and the second pocket is fabricated from a material displaying a second motif.

When the cushion cover displays the first motif, the second pocket is disposed inside the first pocket. The cushion is completely inserted through the first pocket opening and placed inside the first pocket. A zipper can be used to close the first pocket to protect the cushion from unwanted debris such as animal hair and dirt. Furthermore, by fully enclosing the cushion, pets are less likely to damage the cushion.

When the cushion cover displays the second motif, the second pocket is removed from the first pocket by pulling the second pocket through the first pocket opening. After the second pocket is removed from the first pocket, the first pocket is then inserted through the second pocket opening so that the first pocket is placed inside the second pocket. The cushion can then be inserted through the second pocket opening and placed inside the second pocket. While in this position, the second pocket opening can be closed to fully protect the cushion from the outside environment.

The cushion cover is preferably manufactured by providing four separate fabric panels. The panels are stacked adjacent each other and the panel edges are aligned. Thus, the first panel is placed adjacent the second panel, the third panel is placed adjacent the second panel, and the fourth panel is placed adjacent the third panel. The panels are then connected together along the edges. The connection method is preferably performed by sewing the panels together along the aligned edges.

BRIEF DESCRIPTION OF THE DRAWINGS

For a more complete understanding of the present invention and for further advantages thereof, reference is now made to the following Description of the Preferred Embodiments taken in conjunction with the accompanying Drawings in which:

FIG. 3b is a section view of the cushion cover taken along the line 3b—3b of FIG. 3a.

FIG. 4a is a perspective view illustrating the first pocket adjacent the second pocket.

FIG. 4b is a section view of the cushion cover taken along the line 4b—4b of FIG. 4a.

FIG. 5a is a perspective view of the cushion cover illustrating the first pocket being inserted through the second pocket opening so as to display the second motif.

FIG. 5b is a section view of the cushion cover taken along the line 5b—5b of FIG. 5a.

FIG. 6a is a perspective view of the cushion cover displaying the second motif.

FIG. 6b is a section view of the cushion cover taken along the line 6b—6b of FIG. 6a.

FIG. 7a is a perspective view of a second embodiment of the cushion cover.

FIG. 7b is a section view of the cushion cover taken along the line 7a—7a of FIG. 7a.

DESCRIPTION OF THE PREFERRED EMBODIMENTS

Figure 1:
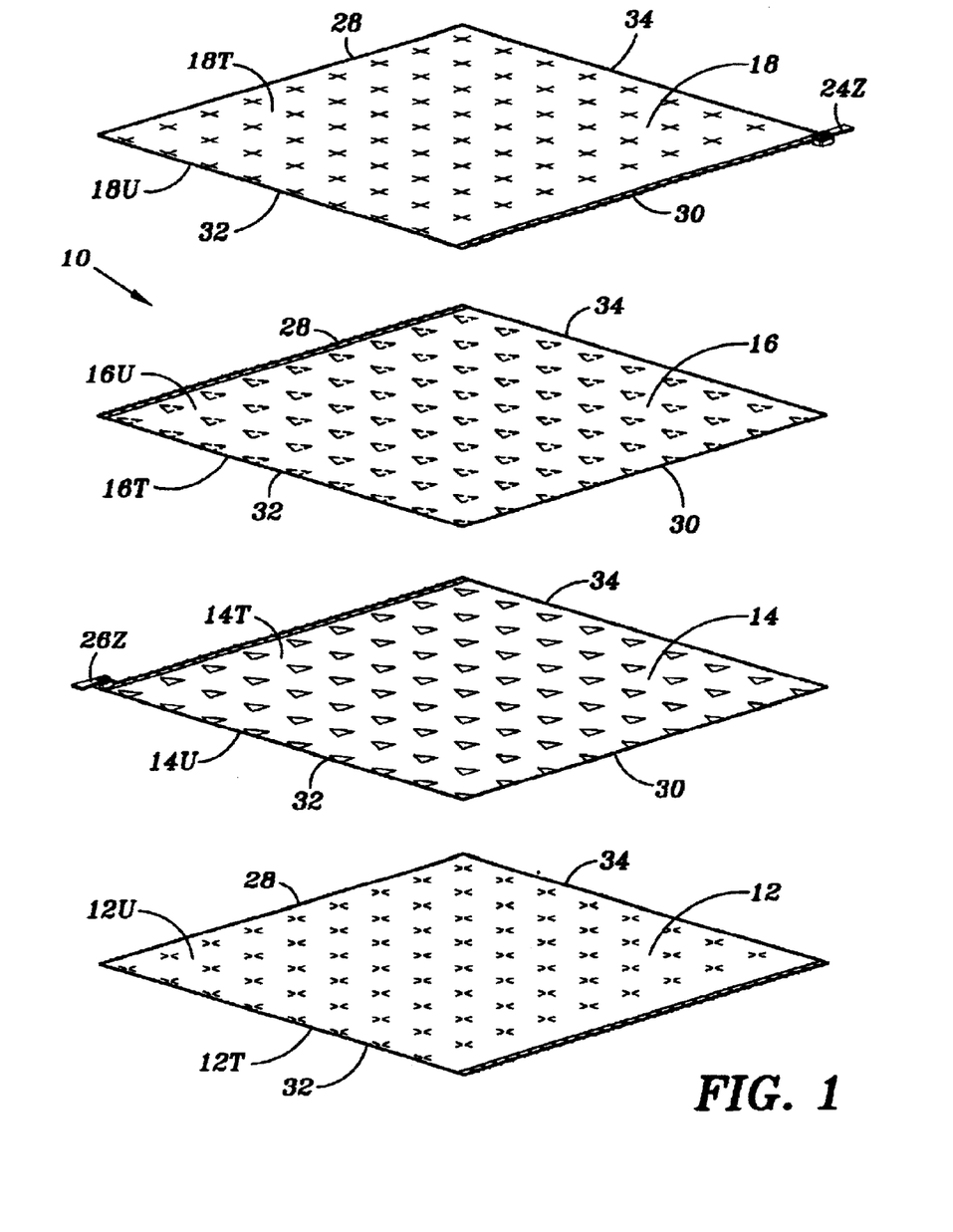
FIG. 1 is an exploded perspective view of the present pet bed cover illustrating the panels.

Referring to FIG. 1, cover 10 includes a first panel 12, a second panel 14, a third panel 16 and a fourth panel 18. Each panel 12–18 can be made from differing fabrics and/or differing motifs so that the user can reconfigure cover 10 to change the overall appearance of cover 10. Panels 12–18 are rectangular in shape, however, it should be realized by one of ordinary skill that any shape can be used, such as, but not limited to, circular shapes, oval shapes, triangular shapes, square shapes, etc. As illustrated, panels 12 and 18 have the same motif, and panels 14 and 16 have the same motif, but different from the motif of panels 12 and 18. Each panel 12–18 includes a topside designated by "T" and an underside designed by "U". Panels 12 and 18 illustrate a first motif designated by a pattern of "X"s and panels 14 and 16 illustrate a second motif designated by a pattern of "Δ"s. It should be realized by one of ordinary skill that Panels 12–18 can each display the same or differing surface motif's.

Figures 2A, 2B:
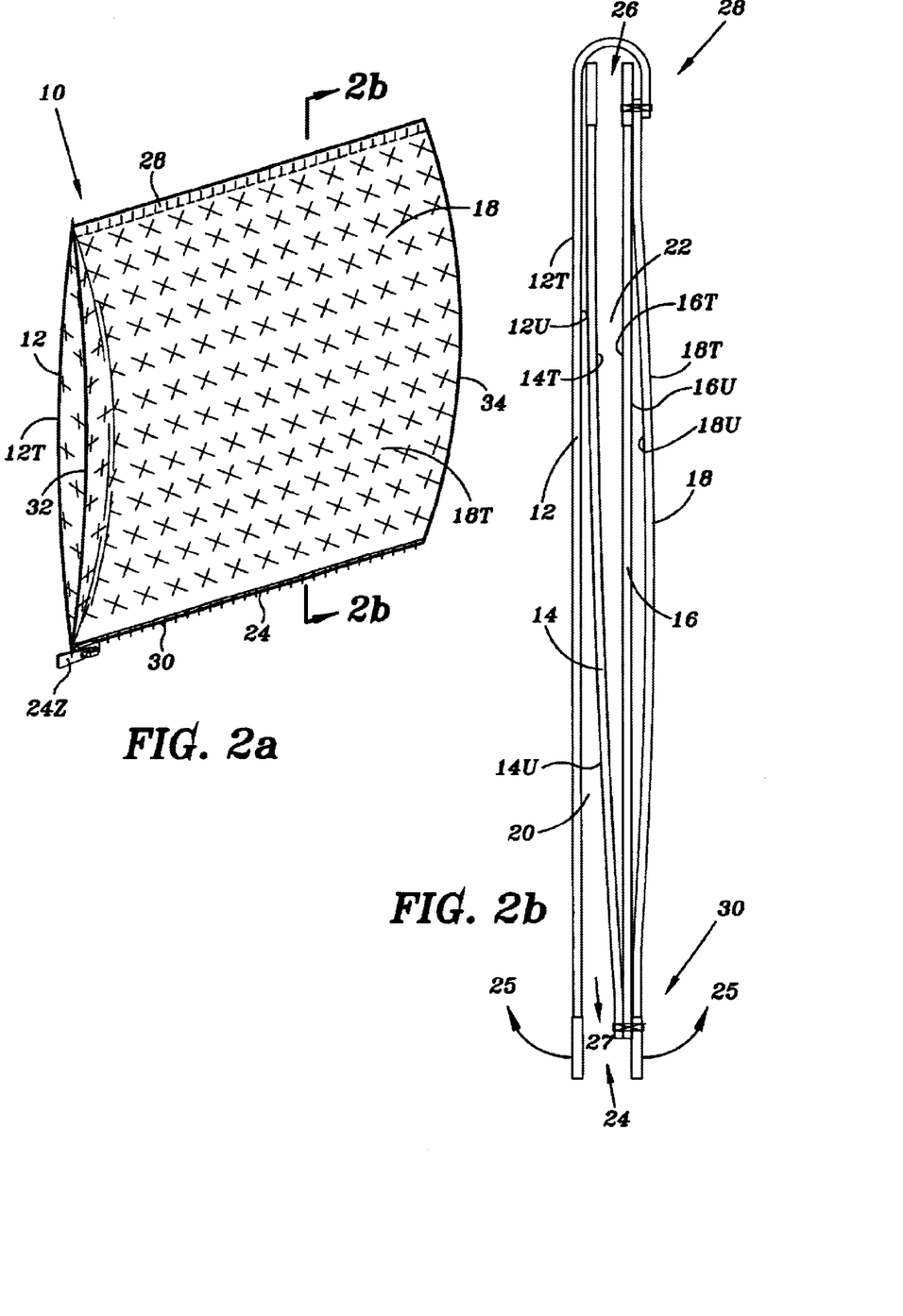
FIG. 2a is a perspective view of the cushion cover displaying the first motif.
FIG. 2b is a section view of the cushion cover taken along the line 2b—2b of FIG. 2a illustrating the second pocket disposed inside the first pocket.
Figure 3A:
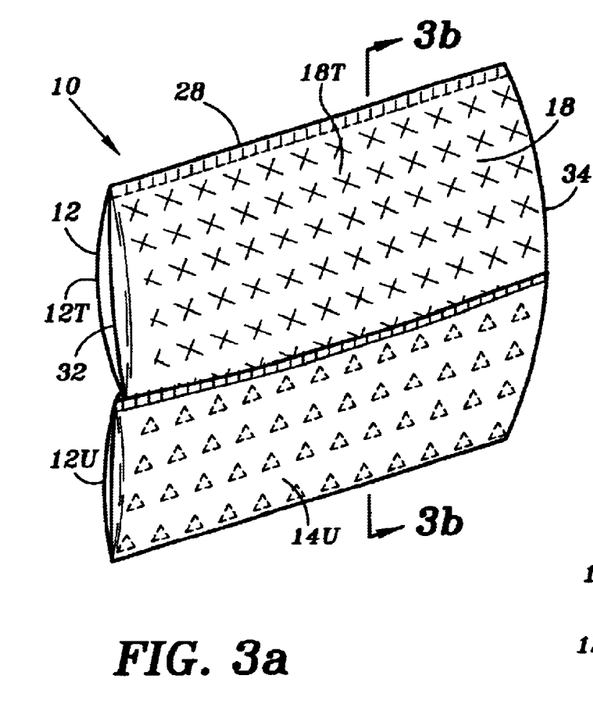
FIG. 3a is a perspective view of the cushion cover illustrating the interior second pocket being inserted through the first pocket opening.
Figure 3B:
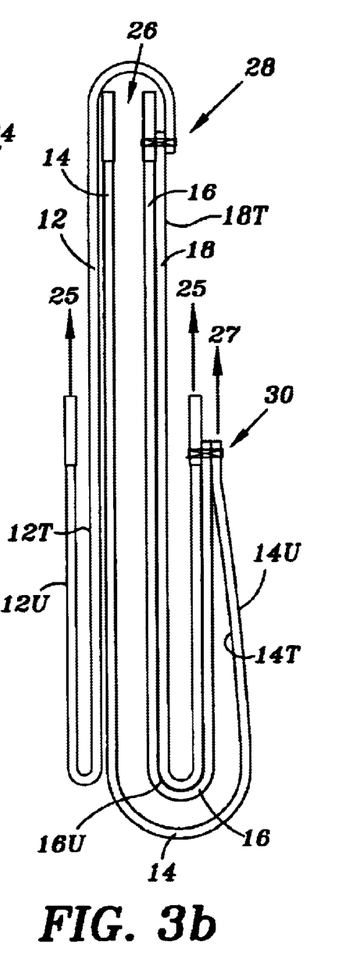
Figures 4A, 4B:
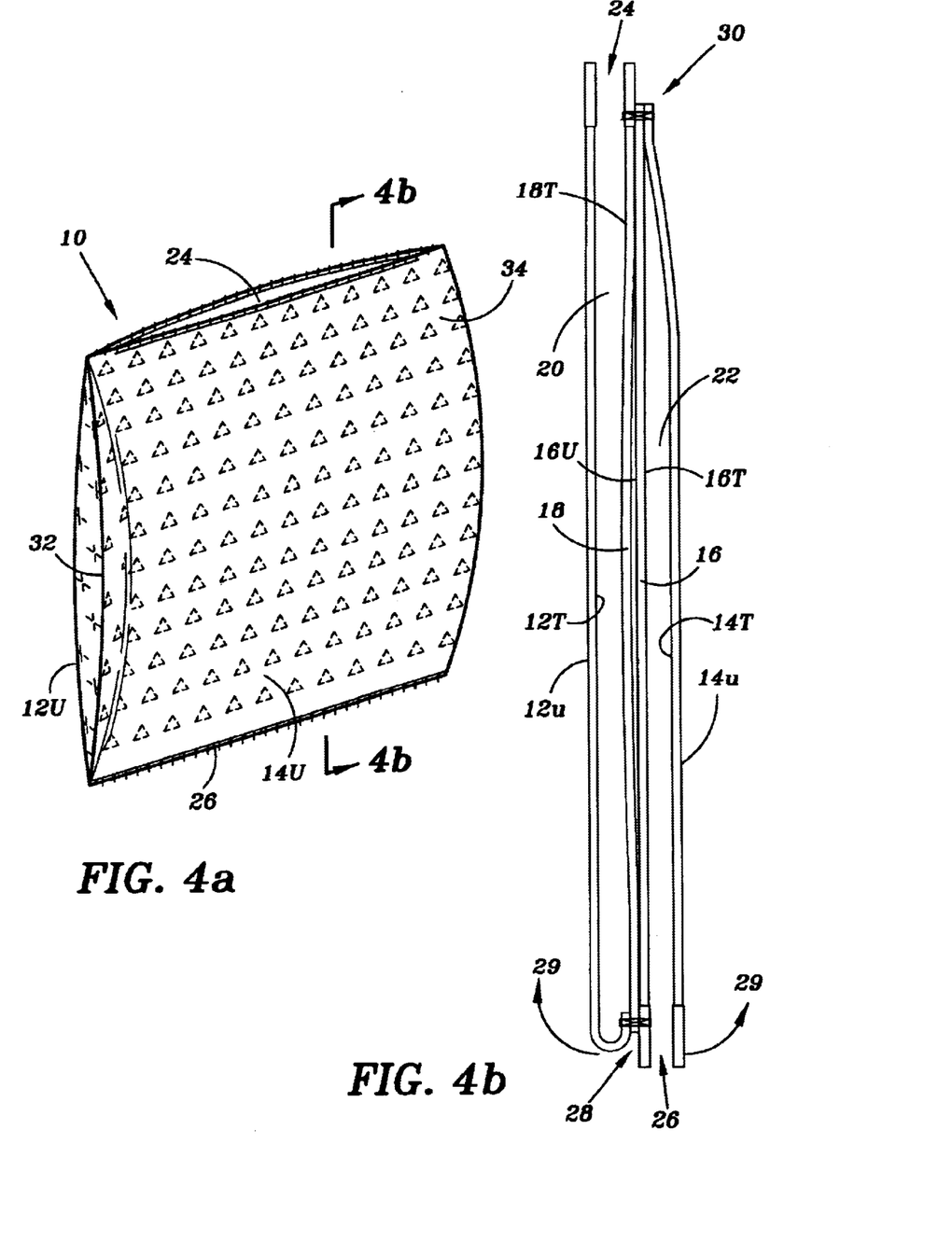
Figures 5A, 5B:
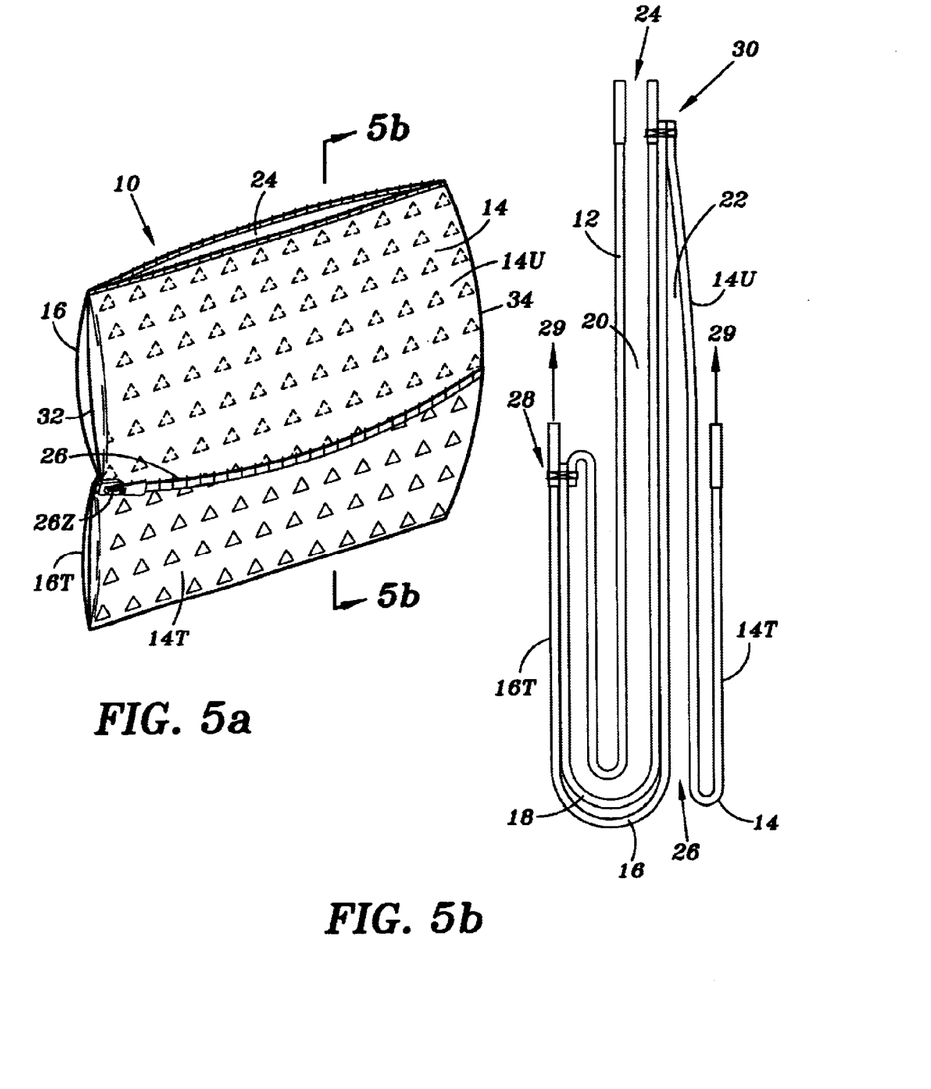

As seen in FIG. 1, panels 12–18 are adjacently stacked so that panel 12 is adjacent to panel 14, panel 14 is adjacent to panel 16, and panel is 16 adjacent to panel 18. Panels 12–18 are connected together along the panel outer edges by stitching (not shown). Referring to FIGS. 2a and 2b, when panels 12–18 are connected, panels 12 and 18 form a first pocket 20 and panels 14 and 16 form a second pocket 22. Openings 24 and 26 define entranceways for first pocket 20 and second pocket 22 respectively and are preferably offset or not aligned. Preferably, openings 24 and 26 are disposed on opposite sides or ends of cover 10. Openings 24 and 26 are sized to receive a cushion (not shown) and are preferably opened and closed with a zipper.

When it is desired to insert the cushion inside cover 10, opening 24 is opened so that the cushion can be placed inside pocket 20. Once placed inside pocket 20, zipper 24Z can be used to close opening 24. By fully inserting the cushion inside pocket 20, the cushion is protected from the outside environment and from potential destruction by pets.

Figures 6A, 6B:
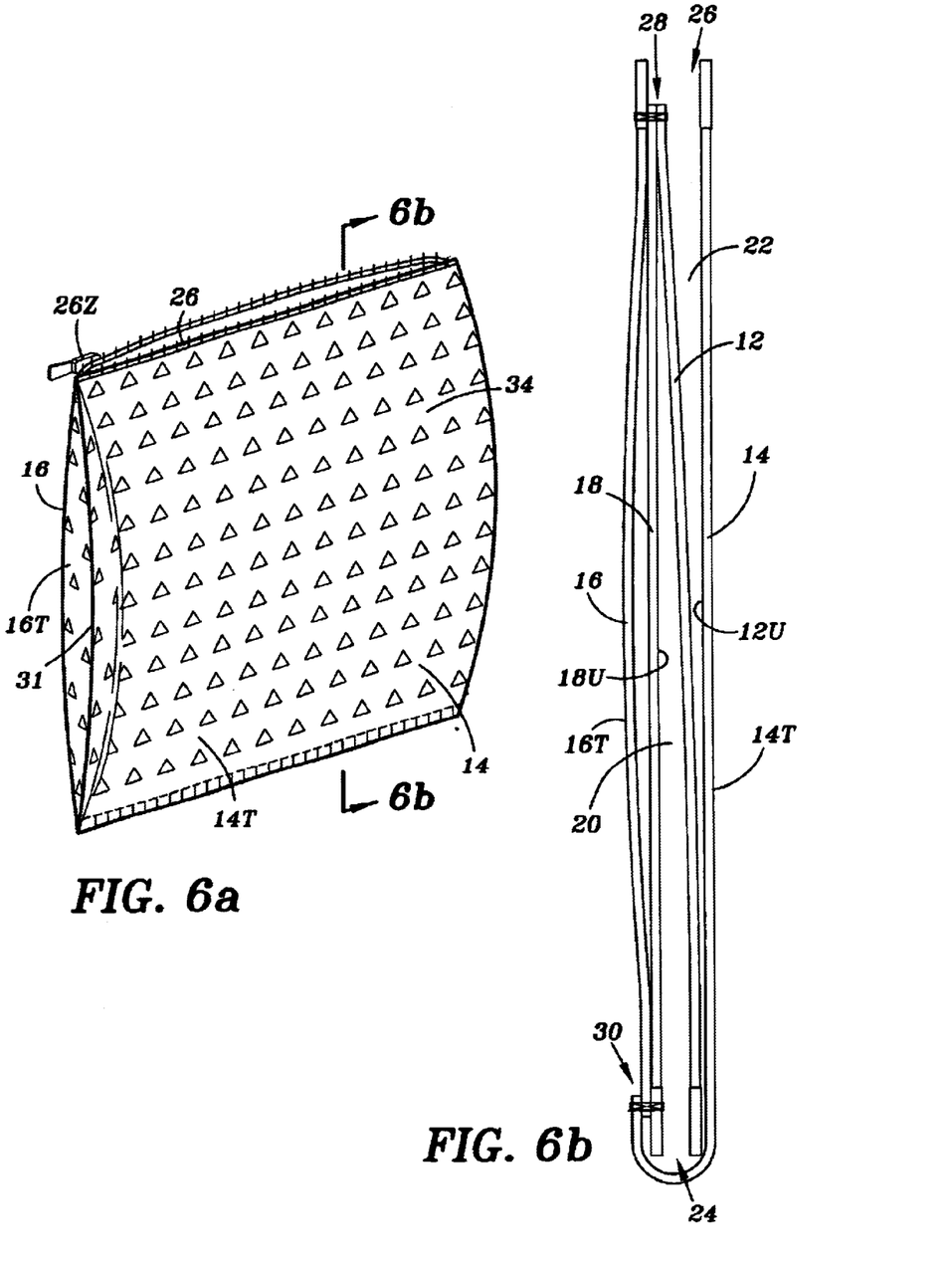

FIGS. 3–6 illustrate cover 10 being reconfigured such that a second surface pattern or motif is displayed on the exterior of cover 10 (FIG. 6a). As seen in FIGS. 2a and 2b, panels 12 and 18 form the exterior surface of cover 10 when the first motif is displayed. When it is desired to display the second motif, first pocket 20 is opened. As first pocket 20 is opened, panels 12 and 18 are turned upward at opening 24 in the direction of arrows 25 (FIG. 2b) and panels 14 and 16 are pulled through opening 24 in the direction of arrow 27. As seen in FIGS. 3a and 3b, panels 14 and 16 are pulled through opening 24 so that undersides 12U and 14U of panels 12 and 14 are exposed. When undersides 12U and 14U are fully exposed, as best seen in FIGS. 4a and 4b, second pocket 22 is removed from first pocket 20 such that first pocket 20 is adjacent second pocket 22. When cover 10 is placed in this configuration, panels 12 and 14 are then upturned in the direction of arrows 29 and panels 16 and 18 can then be pulled through opening 26 (FIGS. 5a and 5b). As panels 16 and 18 are pulled through opening 26, topsides 14T and 16T of panels 14 and 16 become exposed. Once topsides 14T and 16T are fully exposed (FIGS. 6a and 6b), the cushion (not shown) can be inserted inside cover 10 through opening 26. A zipper 26Z can close opening 26 to fully protect the cushion.

Manufacture and assembly of cushion 10 is performed by selecting the material and motif for each panel 12–18. Panels 12–18 are next prepared to the desired size and shape. Once properly sized and shaped, panels 12–18 are configured such that panels 12 and 18 form the first pocket when the first motif is selected (FIGS. 2a and 2b), and panels 14 and 16 form the second pocket and display the second motif (FIGS. 6a and 6b). Once configured, panels 12–18 are stitched together. As seen in FIG. 1, panels 12 and 14 are stacked adjacent each other such that the motif on panel 12 faces opposite the motif of panel 14. Panel 14 is stacked adjacent panel 16 such that the motif on panel 14 directly faces the motif on panel 16. Panel 16 is stacked adjacent panel 18 such that the motif on panel 16 faces opposite the motif on panel 18. Referring to FIGS. 1, 2a and 2b, panels 12,16 and 18 are stitched together along edge 28 and panels 14, 16 and 18 are stitched together along edge 30. In addition, panels 12–18 are stitched together along side edges 32 and 34 so as to form first and second pockets 20 and 22. The order in which the edges of panels 12–18 are stitched together can be varied. In addition, stitching of panels 12–18 can occur while panels 12–18 are placed adjacent each other in any configuration so long as panels 12 and 18 form the first pocket when the first motif is selected (FIGS. 2a and 2b), and panels 14 and 16 form the second pocket when the second motif is selected (FIGS. 6a and 6b).

Figures 7A, 7B:
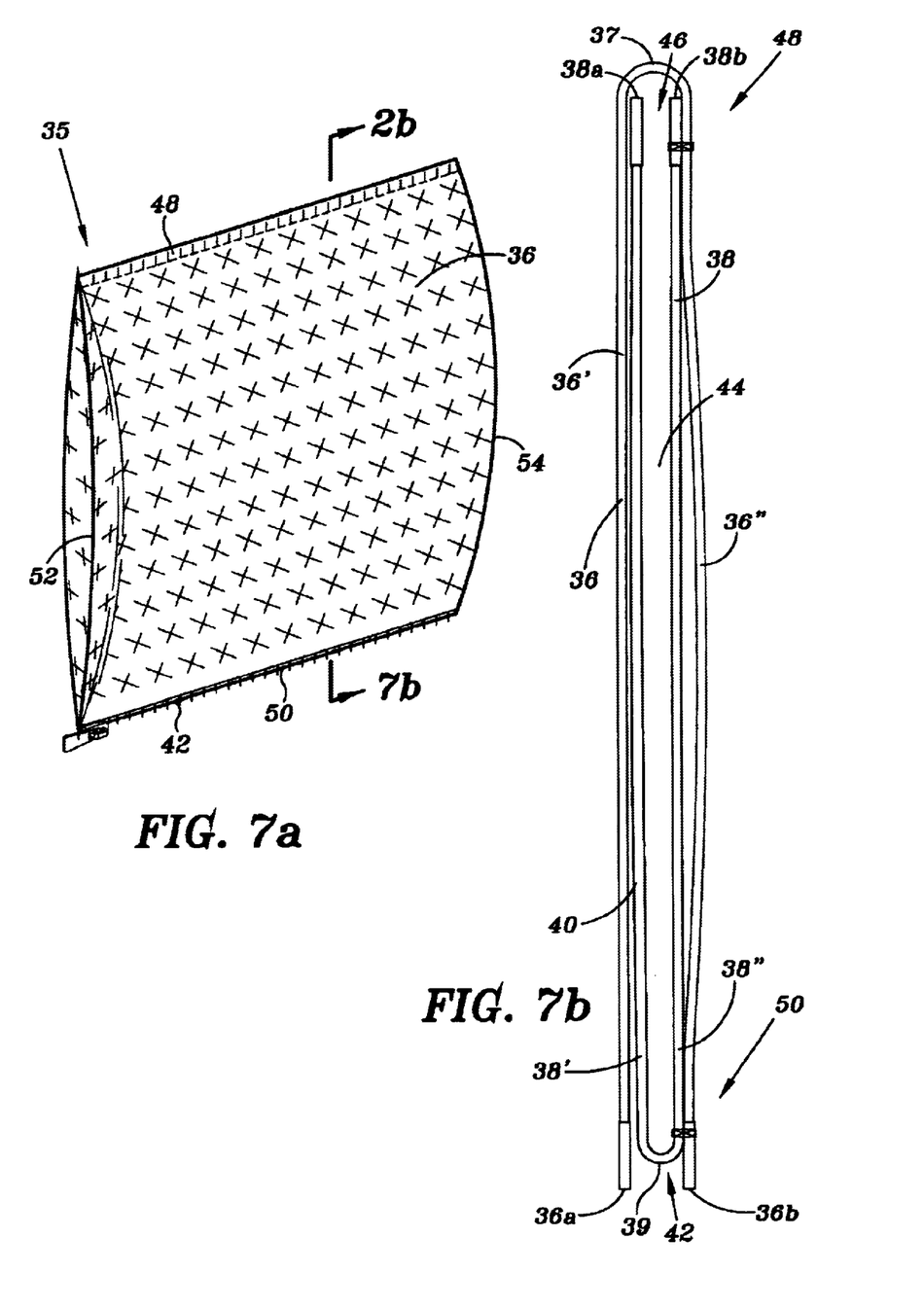

FIGS. 7a and 7b illustrate an additional embodiment 35 defined by panels 36 and 38. While in this configuration, panel 36, which contains a first motif, is a single panel folded in half along fold line 37 to form first and second sections 36' and 36". Panel 36 forms pocket 40 and has a pocket opening 42. Panel 38, having a second motif, is also a single panel folded along fold line 39 forming first and second sections 38' and 38". Panel 38 forms pocket 44 having an opening 46.

When fabricating the embodiment of FIGS. 7a and 7b, panels 36 and 38 are selected and properly sized. Panel 36 is folded along fold line 37 such that edges 36a and 36b are aligned. Similarly, panel 38 is folded along fold line 39 such that edges 38a and 38b are aligned. Panel 38 is disposed between panels 36' and 36" such that opening 46 is disposed adjacent fold line 37. While in this position, panels 36 and 38 are stitched along seams 48 and 50 and along side edges 52 and 54. When it is desired to display the second motif, the pocket 44 is removed from the pocket 40 and pocket 40 is inserted inside pocket 44, in identical fashion to the first embodiment previously described.

Figure 8:
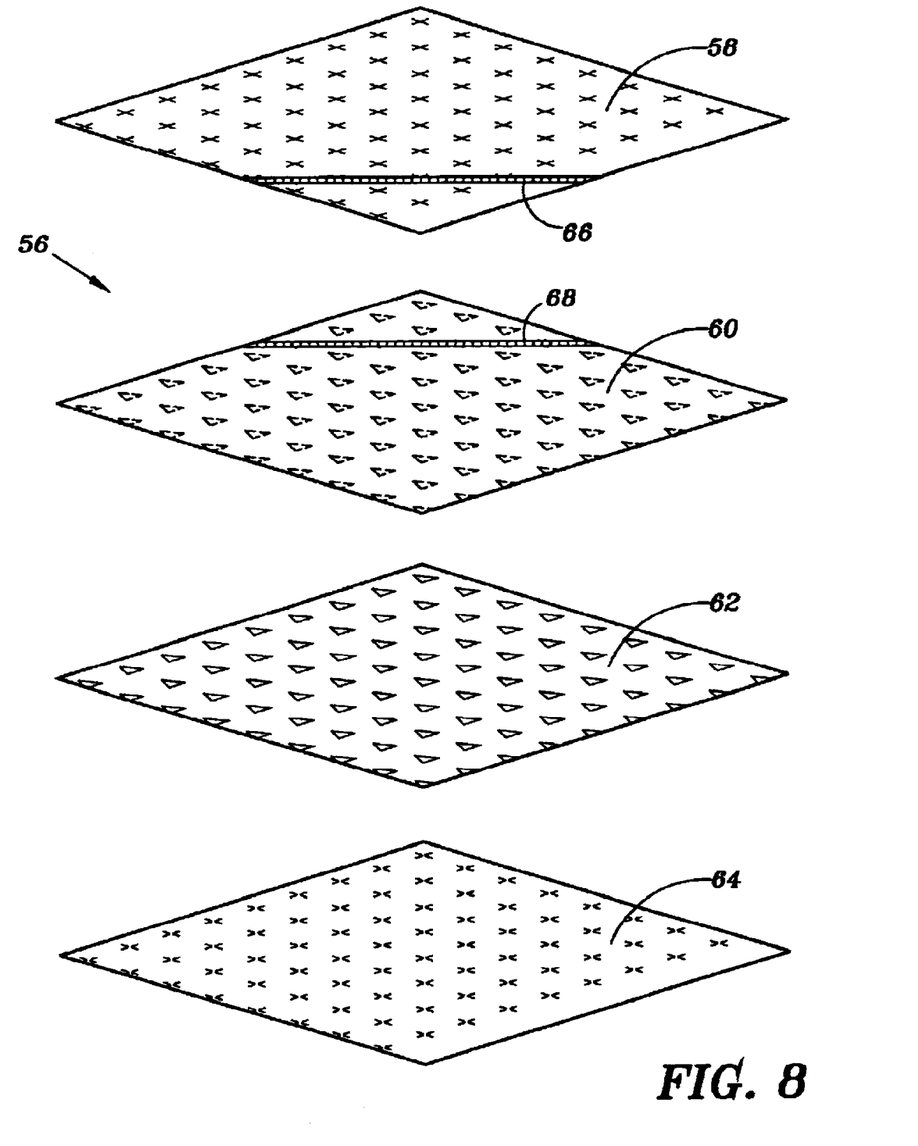
FIG. 8 illustrates an alternate embodiment having the zippers offset from the panel edges.

FIG. 8 illustrates cover 56 comprising panels 58, 60, 62 and 64. In this embodiment, panels 58 and 60 contain openings 66 and 68 that are offset from the panel edges. In this configuration, panels 58–64 are stitched around the perimeter of the panels, in a single pass, after the panels have been oriented, stacked and aligned. When it is desired to display the second motif, the second pocket is removed from the first pocket and the first pocket is inserted inside the second pocket, in identical fashion to the first embodiment previously described.

Other alterations and modifications of the invention will likewise become apparent to those of ordinary skill in the art upon reading the present disclosure, and it is intended that the scope of the invention disclosed herein be limited only by the broadest interpretation of the appended claims to which the inventor is legally entitled.

I claim:

1. A cushion cover for selectively displaying a first motif and a second motif, the cushion cover comprising:
   first and second panels forming a first pocket having an opening adapted to receive the cushion, wherein said first pocket displays the first motif;
   third and fourth panels forming a second pocket having an opening adapted to receive the cushion, wherein said second pocket displays the second motif, said second pocket being connected to said first pocket such that said first pocket opening is offset from said second pocket opening;
   such that when the cover displays the first motif, said second pocket is disposed inside said first pocket; and
   such that when the cover displays the second motif, said second pocket is removed from said first pocket and said first pocket is disposed inside said second pocket.

2. The cover of claim 1 wherein the first and second pocket openings contain a zipper for retaining the cushion in each of said pockets.

3. The cover of claim 1 wherein when said cover displays said second motif, said second pocket is inserted through said first pocket opening and said first pocket is inserted through said second pocket opening such that said first pocket is disposed inside said second pocket.

4. A method of making a cushion cover comprising:
   providing a first panel having a first motif, a second panel having a second motif, a third panel having a third motif, and a fourth panel having a fourth motif, each panel containing a perimeter;
   creating an opening on said first and second panels;
   positioning said first panel adjacent said second panel, placing said third panel adjacent said second panel, and placing said fourth panel adjacent said third panel such that said perimeters are aligned and said first and second panel openings are offset from each other; and attaching said first, second, third, and fourth panels together along said perimeters to join said panels together.

5. The method of claim 4 wherein said step of attaching said first, second, third, and fourth panels is performed by sewing.

6. The method of claim 4 including attaching a zipper to said first and second panel openings.

7. The method of claim 4 wherein said first panel is placed adjacent said second panel such that said first motif faces opposite said second motif; said third panel is placed adjacent said second panel such that said third motif faces said second motif and said fourth panel is placed adjacent said third panel such that said fourth motif does not face said third motif.

8. A method of making a cushion cover comprising:

providing a first panel having a first motif, a second panel having a second motif, a third panel having a third motif, and a fourth panel having a fourth motif, each panel containing an a pair of side edges, a top edge and a bottom edge;

positioning said first, second, third and fourth panels adjacent each other such that side edges are aligned and said top edges are aligned, and said bottom edges are aligned; and attaching said first, second, third, and fourth panels together along said side edges;

creating a first pocket opening by attaching said second, third and fourth edges along said bottom edge; and creating a second pocket opening by attaching said first, third and fourth panels together along said top edge edge.

9. The method of claim 8 wherein said first panel is placed adjacent said second panel such that said first motif faces opposite said second motif, said third panel is placed adjacent said second panel such that said third motif faces said second motif and said fourth panel is placed adjacent said third panel such that said fourth motif does not face said third motif.

10. A cushion cover comprising:

first and second panels forming a first pocket having an opening adapted to receive the cushion;

third and fourth panels forming a second pocket having an opening adapted to receive the cushion, wherein said second pocket being connected to said first pocket such that said first pocket opening is offset from said second pocket opening;

such that when said first and second panels are displayed, said second pocket is disposed inside said first pocket; and such that when said third and fourth panels are displayed, said second pocket is removed from said first pocket and said first pocket is disposed inside said second pocket.

11. The cover of claim 10 wherein when said third and fourth panels are displayed, said second pocket is inserted through said first pocket opening and said first pocket is inserted through said second pocket opening such that said first pocket is disposed inside said second pocket.

12. The cushion cover of claim 11 wherein a first motif is disposed on said first and second panels and a second motif is disposed on said third and fourth panels.

13. The cushion cover of claim 11 wherein a first motif is disposed on said first panel, a second motif is disposed on said second panel, a third motif is disposed on said third panel and a fourth motif is disposed on said fourth panel.

14. The cover of claim 10 wherein said first and second pocket openings contain a zipper for retaining the cushion in each of said pockets.

15. A cushion cover comprising:

a first panel having first and second sections wherein said first panel first and second sections each contain end edges, said first panel first and second sections are folded along a fold line so that said end edges are adjacent forming a first panel opening;

a second panel having first and second sections wherein said first and second sections each contain end edges, said second panel first and section sections are folded along a fold line so that said end edges are adjacent forming a second panel opening;

said second panel is disposed between said folded first panel first and second sections such that said second panel opening is disposed adjacent first panel fold line and said second panel opening is disposed adjacent second panel fold line.

16. The cushion cover of claim 15 wherein said first panel displays a first motif and said second panel displays a second motif.

17. The cushion cover of claim 16 wherein when said first panel displays said first motif, said second panel is disposed between said first panel first and second sections.

18. The cushion cover of claim 17 wherein when said second panel displays said second motif, said second panel is inserted through said first panel opening and said first panel is inserted through said second panel opening such that said first panel is disposed between said second panel first and second sections.

* * * * *